M. STIGLICH.
HOSE COUPLING.
APPLICATION FILED JUNE 4, 1914.
1,121,147.
Patented Dec. 15, 1914.
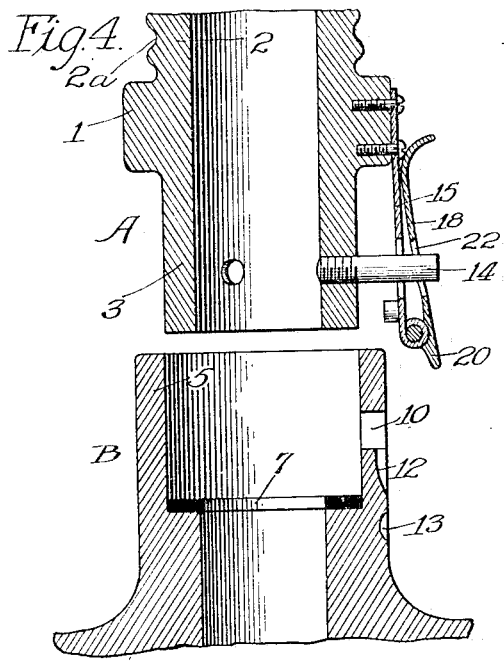
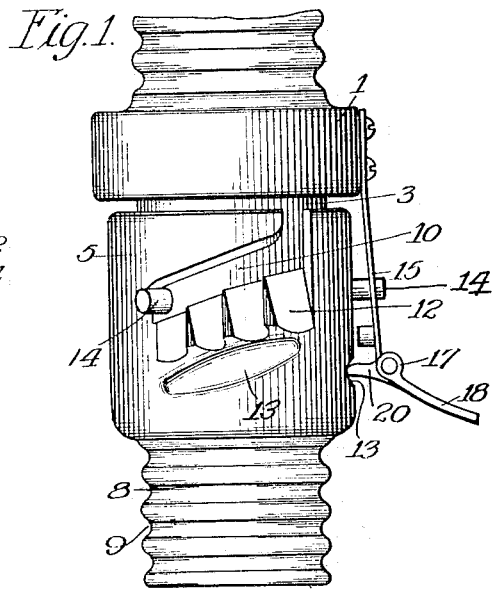
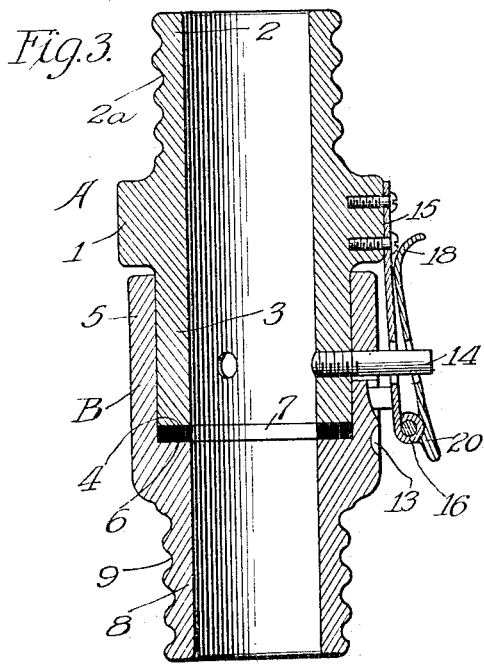
Witnesses.
Ada M. Stark
A. M. Cooper.
Inventor.
Milan Stiglich
By Michael J. Stark & Sons
Attys.

UNITED STATES PATENT OFFICE.

MILAN STIGLICH, OF CHICAGO, ILLINOIS.

HOSE-COUPLING.

1,121,147.  Specification of Letters Patent.  Patented Dec. 15, 1914.

Application filed June 4, 1914. Serial No. 842,929.

*To all whom it may concern:*

Be it known that I, MILAN STIGLICH, a citizen of the United States, and a resident of the city of Chicago, in the county of Cook and State of Illinois, have invented certain new and useful Improvements in Hose-Couplings; and I do hereby declare that the following description of my said invention, taken in connection with the accompanying sheet of drawings, forms a full, clear, and exact specification, which will enable others skilled in the art to which it appertains to make and use the same.

This invention relates generally to improvements in a hose coupling, and it consists, essentially, in the novel and peculiar combination of parts and details of construction, as hereinafter first fully set forth and described and then pointed out in the claims.

In the sheet of drawing already referred to, which serves to illustrate more fully my said invention, Figure 1 is an elevation of my improved hose coupling. Fig. 2 is an elevation thereof taken in a plane at right angles to Fig. 1. Fig. 3 is a longitudinal section in line 3—3 of Fig. 2. Fig. 4 is a like section with the coupling uncoupled and disclosing the female portion thereof as forming an integral part of the discharge end or chamber of a pump and the like.

Like parts are indicated by corresponding characters or symbols of reference in all the figures of the drawing.

The object of my invention is the production of a hose coupling for fire hose and the like which may be quickly coupled and uncoupled, and which, when in the former position, is positively locked against being accidentally uncoupled.

To attain these results my invention comprises two essential parts, a male member A and female member B. Said male member consists of a tubular casting formed with an enlarged exterior portion 1 about medially of the length thereof. One end 2 of the said member is possessed of a plurality of grooves 2ª for the reception of the end of a fire or other hose and the opposite end 3, with its other end 3, with its other face 4, is machined to freely fit in a female face 4, is machined to freely fit in a female portion 5, of the female member B, the lower end of which is provided with an annular, flat shoulder 6, whereon there is adapted to rest a washer or gasket 7 to form a tight joint for obvious reasons. The opposite end 8 of female member B is provided with grooves 9, similar to grooves 2ª on end 2 of the male member A and adapted for the same purposes.

In the wall of female portion 5 are produced a plurality of essentially helical slots 10, equally spaced from each other, which slots terminate in short longitudinal slots 11, extending through the upper edge of the member 5. Directly below and adjacent each of these helical slots 10 and formed in the outer periphery of the female portion 5, there are a series of ratchet teeth 12, extending the length of said slots, and, below said teeth is provided for each slot, a concave groove 13, also of the same length as said slots. It may be added that said grooves are concaved both laterally and longitudinally for purposes hereinafter described.

The lower end 3 of the male portion A is provided with a series of outwardly extending radial studs 14 equal in number and circumferential spacing to the slots 11 of female portion 5. Adapted to embrace the outer end of one of these studs and having its upper end fixed to enlargement 1 of the male member A, there is a flat blade spring 15, which spring has at its lower end hinge ears 16, provided for the reception therebetween of a similar ear 17 of a pivoted lever 18, a pintle 19 serving to connect said lever and blade spring.

Extending from lever 18 there is a nose 20, which nose is adapted to engage any of the grooves 13 on female portion 5 and thereby lift, as it were, the blade spring 15 away from said member 5 as clearly seen in Fig. 1. Projecting inwardly from the inner face of blade spring 15 is a short pin or dog 21, which is arranged so as to engage the ratchet teeth 12 already described.

I will now describe the operation of my coupling. The studs 14 on the male member A are first entered into slots 11 in female portion 5 until the helical slots 10 are reached, whereupon a spanner wrench (not shown) is applied to the ends of the studs projecting beyond the periphery of the said portion 5 and the members A and B rotated in reverse directions. The spanner wrenches are only used in the larger couplings. In the instance of small couplings, the hands are employed grasping each member and rotating the same as already described. In Fig. 2 I indicate projections 50 on both the members A and B for the application of the spanner wrenches, so as to remove the pulling strain from the studs 14. The said studs 14 engaging the helical slots 10 will tend to draw the members A and B tightly together in an obvious manner and form a tight joint at the gasket 7. It is now to be understood that the dog 21 engages the nearest ratchet tooth 12 and said ratchet teeth are so arranged as to prevent the reverse rotation of the member A, so that accidental uncoupling of the members is prevented. When, however, it is desired to uncouple the parts, the lever 18 is swung downwardly and the nose 20 caused to engage the concave groove 13, whereupon the dog 21 is lifted from engagement with the ratchet teeth 12, thereby permitting the reverse rotation of the member A in a manner easily comprehended. In its normal position lever 18 extends upwardly essentially parallel to and in contact with blade spring 15, and in said lever there is an opening 22 permitting the passage therethrough of stud 14 to render this arrangement possible.

While in the drawing I have shown the male member A with three studs 14 spaced 120 degrees apart and the female member B with three slots 10 and 11, in small couplings I may only employ two of each and in larger sizes four may be required as the case may be.

In Fig. 4 I indicate the female member B as formed integrally with a discharge element of a fire engine and the like. Or the said member may be cast in connection with a hydrant outlet as may be desired.

I now direct attention to the ease and rapidity with which this device may be coupled and uncoupled; the peculiarly positive lock against accidental uncoupling provided by the combination of the ratchet teeth 12, the blade spring 15, and its engaging dog 21; and the simple and effective lock release produced by the lever 18, its nose 20, and the concaved grooves 13.

While herein I have disclosed the perferred mode of practicing my invention, I may make such changes and alterations as may suggest themselves to the skilled mechanic or permitted under the doctrine of equivalents.

Having thus fully described my invention I claim as new and desire to secure to myself by Letters Patent of the United States:—

1. A hose and the like coupling including a male member and a female member fitting thereover, there being helical slots through the wall of said female member, ratchet teeth adjacent said slots, projections on said male member engaging said slots, a blade-spring having a dog thereon engaging said ratchet teeth, and means for disengaging said dog.

2. A hose and the like coupling including a male member and a female member fitting thereover, there being helical slots through the wall of said female member, ratchet teeth adjacent said slots, projections on said male member engaging said slots, a blade-spring having a dog thereon engaging said ratchet teeth, and a lever hinged to said blade spring, and a nose on said lever engaging said female member.

3. A hose and the like coupling including a male member and a female member fitting thereover, there being helical slots through the wall of said female member, ratchet teeth adjacent said slots, projections on said male member engaging said slots, a blade spring having a dog thereon engaging said ratchet teeth, there being laterally and longitudinally concaved grooves adjacent said ratchet teeth, a lever hinged to said blade spring, and a nose adapted to engage said grooves.

In testimony whereof I have hereunto set my hand in the presence of two subscribing witnesses.

MILAN STIGLICH.

In the presence of—
C. H. ERBEN,
WILLIAM O. STARK.

Copies of this patent may be obtained for five cents each, by addressing the "Commissioner of Patents, Washington, D. C."